(No Model.)

G. E. TAFT.
STOPPING MECHANISM FOR LOOMS.

No. 365,650. Patented June 28, 1887.

WITNESSES:
Willis Fowler
Chas. H. Luther Jr.

INVENTOR:
Gustavus E. Taft
by Joseph A. Miller & Co
Attys.

UNITED STATES PATENT OFFICE.

GUSTAVUS E. TAFT, OF WHITINSVILLE, MASSACHUSETTS.

STOPPING MECHANISM FOR LOOMS.

SPECIFICATION forming part of Letters Patent No. 365,650, dated June 28, 1887.

Application filed March 19, 1886. Serial No. 195,784. (No model.)

*To all whom it may concern:*

Be it known that I, GUSTAVUS E. TAFT, of Whitinsville, in the county of Worcester and State of Massachusetts, have invented certain new and useful Improvements in Stopping Mechanisms for Looms, of which the following is a full, clear, and exact description, reference being had to the accompanying drawings, forming part of this specification.

My invention relates to the class of machines known as looms, and has especially to do with the brake mechanisms employed in said machines.

In this class of machines when it becomes necessary to stop the machine, because of the defective supply of weaving material or for other reasons, it is very desirable to at once and completely arrest the motions of the machine; but this perfect stop-motion is rarely accomplished, and after the brake is put on the friction, the machine, by virtue of its momentum, will not cease at once to move. On the contrary, it has a certain die-away motion before coming to rest, and thereby the shuttle is allowed to make several picks. The work done by these picks has to be taken out before the machine can be started up again, and the same has therefore to be reversed by hand and the work undone, and of course this cannot be done while the brake is kept on the friction; and, moreover, when the brake is thrown off the friction, the machine is thereby started in the ordinarily-constructed loom.

The objects of my invention are to provide a brake for looms which is simple and has a positive and quick action and which is readily thrown out of and into action, and, further, to provide a brake whereby the same may be thrown out of action without affecting the belt-shipper, which then remains to be operated, subsequently at will.

To the above purposes my invention consists in certain new and useful constructions and arrangements of the essential parts of the device, as hereinafter fully described and claimed.

Figure 1:
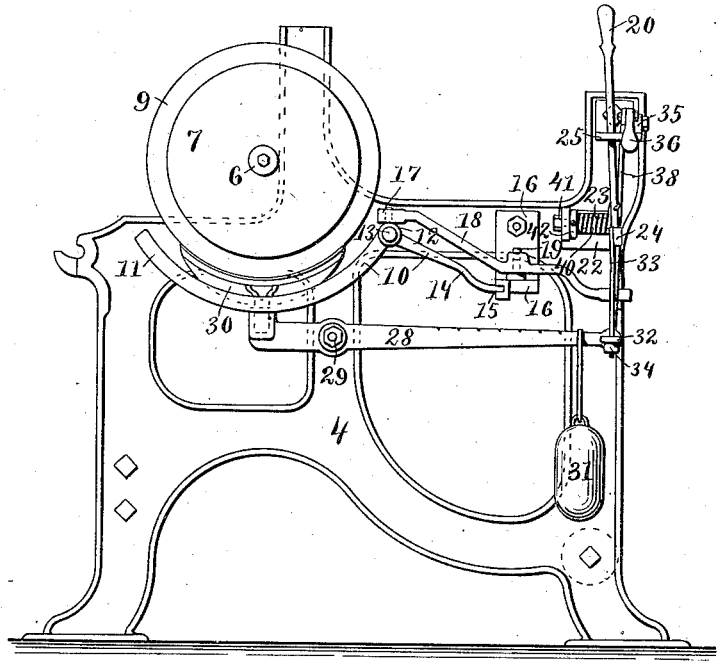
Figure 2:
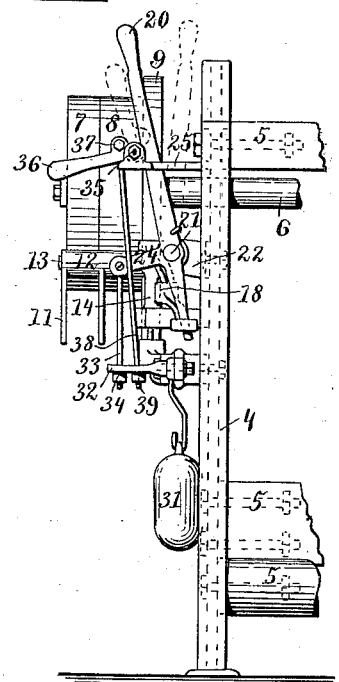
Figure 3:
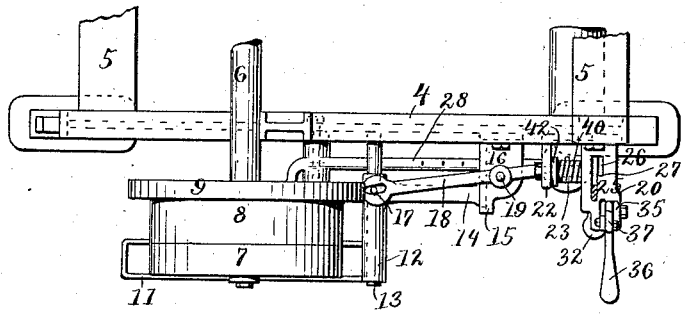

In the accompanying drawings, Figure 1 represents in side elevation a portion of a loom with my device attached thereto. Fig. 2 represents a front view of Fig. 1 with the tie-pieces 5 broken off. Fig. 3 represents a top view of Fig. 1, partly in section.

Referring to the drawings, the part designated 4 is the side frame of the loom, and the cross or tie pieces 5, shown in part, are bolted to the frame. The crank-shaft 6 is mounted in the side frame, 4, and serves to vibrate the lay, (not shown;) and upon its end are fixed the loose pulley 7 and the fast pulley 8, upon the inner side of which latter is the raised portion 9, extending entirely around said pulley, and is the so-called "friction-piece," against which the brake bears. The driving-belt (not shown) takes about the upper halves of the pulleys 7 and 8, and is carried by the guide 11 of the shipper 10, the sleeve 12 of which is loosely mounted on the stud 13, which projects from the frame 4. This sleeve 12 slides on the stud 13 a sufficient distance to allow the belt to be shipped across the pulleys. The guide-arm 14 extends from one side of sleeve 12 and projects outwardly and slightly downwardly, and its free end works and slides in the slot 15, formed in the step 16, which is fixed to the side-frame, 4.

The pin 17 upon the upper side of the sleeve 12 takes into a slot at the end of the rocker-bar 18, which is of the shape shown, and is pivoted near its center upon the pin 19, fixed upon the step 16. The other end of rocker-bar 18 has an eye, into which is set the lower end of the shipper-lever 20, mounted loosely upon the sleeve 40. (Shown dotted in Figs. 1 and 2.) The sleeve 40 sets into an opening in bracket 22, and is provided with the collar 42, abutting against the bracket 22. The bolt 21 has a fixed head and passes through sleeve 40 to the outside of bracket 22, where it is screw-threaded and provided with nut 41, which takes up against the side of bracket 22, and binds the sleeve and bolt immovably together. The spiral spring 23 is placed about the sleeve 40, and has one of its free ends fixed to collar 42 and the other fixed to the shipper-lever 20, which turns on said sleeve and is actuated by said spring. The spring 23 may be made more tense by loosening nut 41 and turning the sleeve 40, as desired. The spring 23 is under greatest tension when the shipper-lever 20 is in position of the broken lines, Fig. 2, at which time the brake is off the friction. The shipper-lever 20 has the rigid branch piece 24, and the upper part of said lever works in the slot 26, formed in the bracket 25, fixed to the side frame, 4. The slot 26 has the shoulder 27, against which the side of shipper-lever 20 rests when in the broken-line position.

The brake-lever bar 28 is pivoted at 29 onto the frame 4, and has swiveled upon the short arm the brake-shoe 30, shaped to conform to the friction 9 and to hug the same closely.

By virtue of constructing the brake-shoe 30 with a swivel-joint near the center of the back of the shoe, as shown, I secure the important advantage of having the brake-shoe always seated snugly in contact with the friction when the brake is put on. The brake-shoe being shaped on the contact-surface to conform with the curve of the periphery of the friction 9, it is evident that the pressure with which the brake is put on will be distributed over the whole contact-surface of the shoe, and thereby a more efficient brake will be provided.

The friction 9 may be modified from what I have shown by employing a separate wheel keyed upon the shaft 6 as an equivalent. The weight 31 is hung in any suitable manner upon the long arm of the brake-lever and is used to give operative force to the brake in its action, and this force can be regulated by sliding the weight along on the lever-arm. The extension 32 is fixed at the end of the long arm of the brake-lever 28, and has the short rod 33, passing loosely through an eye therein. The rod 33 is prevented from sliding through the eye in extension 32 in one direction by means of the nut 34, secured upon its free end. At the upper end the rod 33 is fixed to the branch 24 and turns thereon.

To the ear 35, mounted on the bracket 25, is fastened by a pin-joint the auxiliary lever 36, which carries a lug, 37, to which is fastened loosely the connecting-rod 38, which runs through an eye in the extension 32, and is caught on the lower end by a nut, 39.

In the position of the parts shown the machine is at rest, the brake is on the friction 9, and the driving-belt is on the loose pulley 7. Now, it is obvious that when the machine is to be turned backward a little to remove the work done by the extra and useless picks of the shuttle, after the brake is put on, the same can be easily done by use of my structure, for the brake-shoe 30 can be thrown off the friction 9 and the belt left upon the loose pulley 7, by means of the auxiliary lever 36 and the connecting-rod 38, since when the auxiliary lever 36 is placed in the positions of the broken lines, Fig. 2, the brake-lever 28 is raised by its long arm and the shoe 30 withdrawn from the friction, and the extension 32 slides upon the rod 33, thereby allowing the belt-shipper 10 to remain undisturbed, and to be later operated by the shipper-lever 20 being placed in position of the broken lines. In this condition of the machine the same can be turned back and the work of the extra picks undone for the proper working of the loom when started up again.

It is evident that when the auxiliary lever 36 is put in the position of the broken lines the tension of weight 31 through rod 38 on lug 37 of said lever will maintain said lever in that position, because the lug 37 is thrown over beyond the ear 35, to which the lower end of the auxiliary lever is attached. This position of the auxiliary lever will be maintained until the shipper-lever 20 is thrown into the broken-line position, when the weight being taken off the auxiliary lever, the same will obviously gravitate back into the position of the full lines, and will remain in this position till the above operation is repeated.

The brake and shipper may be operated by any of the well-known stop-motions usually employed in this class of machines.

My device is easily operated and is efficient in its workings.

There may be various modifications made in the essential features of my device without departing from the spirit of my invention herein described and claimed.

Having thus described my invention, I claim as new and desire to secure by Letters Patent—

1. The combination, as hereinbefore set forth, with a belt-shipper, substantially as described, and a rocker-bar for moving the shipper, of a brake-lever, a pivoted shipper-lever provided with an arm and engaging the rocker-bar for actuating the same, and a rod directly connecting the arm of the shipper-lever with the brake-lever, substantially as and for the purpose herein described.

2. The combination of the friction or brake wheel, the brake mechanism, substantially as described, engaging said friction or brake wheel, a belt-shipper and a connected rocker-bar, a pivoted shipper-lever provided with a rigid arm and a rod pivoted to said arm and loosely connected with the brake mechanism, one end of said shipper-lever engaging with the rocker-bar, whereby the shipper-lever may be put on and off the brake and ship the belt-shipper in the same movement, an auxiliary lever pivoted at one end and provided with a lateral lug, and a connecting-rod attached to said lug and loosely connected with the brake mechanism, whereby the auxiliary lever may be operated to throw off the brake without disturbing the shipper-lever or the belt-shipper, substantially as and for the purpose herein described.

3. The combination of a brake-wheel and a weighted pivoted brake-lever, a belt-shipper provided with a pivoted rocker-bar, and a spring-acted shipper-lever pivoted near one end and provided with an arm and having one end thereof engaging the rocker-bar, with an auxiliary lever pivoted at one end and provided with a lug, an extension-piece upon the end of the brake-lever, a rod pivoted to the arm of the shipper-lever and sliding in said extension-piece, and a rod pivoted to the lug on said auxiliary lever and sliding in said extension-piece, all constructed substantially as and for the purpose herein described.

4. The combination of the pivoted and weighted brake-lever 28, provided at one end with the swiveled brake-shoe 30, and at the other end with the extension-piece 32, the belt-shipper 10, journaled on stud 13, and the pivoted rocker-bar 18, with the spring-acted shipper-lever 20, pivoted at 21 and provided with the rigid arm 24, and having one end engaging the said rocker-bar 18, the auxiliary lever 36, pivoted at 35 and provided with the lug 37 and the rod 38, sliding in extension-piece 32, and the rod 33, connected with arm 24 of the shipper-lever and sliding in the extension-piece 32, all constructed and operated substantially as and for the purpose herein set forth.

5. The combination, with the loom-frame, of the pivoted weighted brake-lever 28, provided with the swiveled brake-shoe 30 and the perforated extension-piece 32, the belt-shipper 10, the pivoted rocker-bar 18, engaging said belt-shipper, the slotted bracket 25, secured to the loom-frame, the pivoted shipper-lever 20, provided with arm 24 and engaging the rocker-bar, the rod 33, loosely connecting said arm 24 and the extension-piece on the brake-lever, and the pivoted auxiliary lever 36, provided with the connecting-rod 38, taking loosely through the said extension-piece, substantially as herein described.

GUSTAVUS E. TAFT.

Witnesses:
M. F. BLIGH,
J. A. MILLER, Jr.